United States Patent [19]

Saltini

[11] 3,781,807

[45] Dec. 25, 1973

[54] STORED PROGRAM ELECTRONIC COMPUTER USING MACROINSTRUCTIONS

[75] Inventor: Fabrizio Saltini, Modena, Italy

[73] Assignee: Ing. C. Olivetti & C., S.p.A., Ivrea (Torino), Italy

[22] Filed: Dec. 31, 1969

[21] Appl. No.: 889,570

[30] Foreign Application Priority Data

Jan. 20, 1969 Italy .............................. 50206 A/69

[52] U.S. Cl. .............................................. 340/172.5
[51] Int. Cl. .............................................. G06f 13/00
[58] Field of Search .................................. 340/172.5

[56] References Cited

UNITED STATES PATENTS

| | | | |
|---|---|---|---|
| 3,585,600 | 6/1971 | Saltini | 340/172.5 |
| 3,281,792 | 10/1966 | Raymond | 340/172.5 |
| 3,292,155 | 12/1966 | Neilson | 340/172.5 |
| 3,325,788 | 6/1967 | Hackl | 340/172.5 |
| 3,380,025 | 4/1968 | Ragland | 340/172.5 |
| 3,404,378 | 10/1968 | Threadgold et al. | 340/172.5 |
| 3,475,732 | 10/1969 | Avsan et al. | 340/172.5 |
| 3,477,064 | 11/1969 | Hilgendorf et al. | 340/172.5 |
| 3,478,322 | 11/1969 | Evans | 340/172.5 |
| 2,497,630 | 2/1970 | Lucas et al. | 340/172.5 X |

FOREIGN PATENTS OR APPLICATIONS

| | | | |
|---|---|---|---|
| 821,707 | 11/1968 | Italy | 340/172.5 |

*Primary Examiner*—Paul J. Henon
*Assistant Examiner*—Melvin B. Chapnick
*Attorney*—Birch, Swindler, McKie and Beckett

[57] ABSTRACT

A computer for executing a program made up of a series of macroinstructions each including a plurality of instructions grouped in a fixed order and haVing a serial operational memory the computer, comprising means for interpreting the instructions of a macroinstruction stored in a predetermined portion of the operational memory. Furthermore the computer comprises means responsive to the interpretatation by said interpreting means of a predetermined instruction in the macroinstruction stored in said predetermined portion of the operational memory for causing the interpreting means to commence interpreting the information stored in a selected portion of said memory as a series of macroinstructions. Additional means are connected to the operational memory for executing the series of macro-instructions serially in response to the determined instruction.

2 Claims, 7 Drawing Figures

INVENTOR.
FABRIZIO SALTINI

INVENTOR.
FABRIZIO SALTINI

PATENTED DEC 25 1973

3,781,807

SHEET 3 OF 6

INVENTOR.
FABRIZIO SALTINI

| CODES | LABEL | HORIZ. TAB. | ADDRESS | PAPER CONTROL: OPERATION SELECT | PAPER CONTROL: JUMP LENGTH | PAPER CONTROL: FUNCTION | Z1: FUNCTION | Z1: ZONE | Z1: ADDRESS | Z2: FUNCTION | Z2: ZONE | Z2: ADDRESS | Z3: FUNCTION | Z3: ZONE | Z3: ADDRESS | SHIFT | ZONE CAPACITY |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| 0 | | 15 | 240 | NO | NO | NO | NO | 0 | 0 | NO | 0 | 0 | NO | 0 | 0 | NO | NO |
| 1 | N | 13 | 224 | RD | SC I.1 | | ◇ | 10 | 1 | + | 10 | 1 | + | 10 | 1 | d1 | - 0 |
| 2 | | 11 | 208 | RS | SC I.2 | INT | | 20 | 2 | × | 20 | 2 | ÷ | 20 | 2 | d2 | - 1 |
| 3 | | 9 | 192 | RD RS | SC I.3 | AR INT | * | 30 | 3 | − | 30 | 3 | − | 30 | 3 | d3 | - 2 |
| 4 | | 7 | 176 | TI | SC I.4 | | C | 40 | 4 | | 40 | 4 | | 40 | 4 | d4 | - 3 |
| 5 | | 5 | 160 | RD TI | | AR | ∣◇∣ | 50 | 5 | ∣+∣ | 50 | 5 | ∣+∣ | 50 | 5 | d5 | - 4 |
| 6 | | 3 | 144 | RS TI | | TRC INT | | 60 | 6 | ↑ | 60 | 6 | ↓ | 60 | 6 | d6 | - 5 |
| 7 | | 1 | 128 | RD RS TI | | TRC AR-I | ∣*∣ | 70 | 7 | ∣−∣ | 70 | 7 | ∣−∣ | 70 | 7 | d7 | - 6 |
| 8 | | 14 | 112 | TS | | | J | 80 | 8 | CL J | 80 | 8 | CL J | 80 | 8 | | - 7 |
| 9 | | 12 | 96 | RD TS | SC S.1 | | ◇ USP | 90 | 9 | | 90 | 9 | SS < | 90 | 9 | s1 | - 8 |
| J | | 10 | 80 | RS TS | SC S.2 | | USP | 100 | | USP | 100 | | USP | 100 | | s2 | - 9 |
| K | | 8 | 64 | RD RS TS | SC S.3 | | * USP | 110 | | | 110 | | | 110 | | s3 | -10 |
| L | | 6 | 48 | TI TS | SC S.4 | | | 120 | | | 120 | | | 120 | | s4 | -11 |
| M | | 4 | 32 | RD TI TS | | | ∣◇∣ USP | 130 | | | 130 | | | 130 | | s5 | -12 |
| N | | 2 | 16 | RS TI TS | | | Mα | 140 N | N | Mα | 140 N | N | Mα | 140 N | N | s6 | -13 |
| / | | 0 | 0 | RD RS TI TS | | | ∣*∣ USP | 150 | | | 150 | | | 150 | | s7 | -14 |
| CEL | 1 | 2 | 3 | 4 | 5 | 6 | 7 | 8 | 9 | 10 | 11 | 12 | 13 | 14 | 15 | 16 | 17 |

Fig.3a

JUMP INSTRUCTION "J"

Fig.3

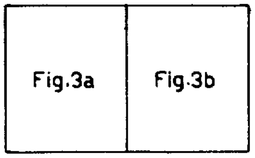

*INVENTOR.*
FABRIZIO SALTINI

| AUX. MEM. TRANS. | | | | PRINT. SELECT | METHOD | KEY BD. SELECT | | JUMP | | JUMP ADDRESS | | | NORMAL ADDRESS | | | CODES |
|---|---|---|---|---|---|---|---|---|---|---|---|---|---|---|---|---|
| TRACK ADDRESS | | BLOCK ADDRESS | | | | KEY BD | COMMANDS | TEST | CONDITIONS | TRACK | BLOCK | | TRACK | BLOCK | | |
| 18 | | 19 | 20 | 21 | 22 | 23 | 24 | 25 | 26 | 27 | 28 | 29 | 30 | 31 | 32 | |
| NO | | 0 0 | 0 | NO | NO | NO | NO | NO | NO | NO | 0 0 | 0 | X | 0 0 | 0 | 0 |
| READING | P1 | 10 1 | 1 | SN | E | TN | B | FF | FF | P1 | 10 1 | 1 | P1 | 10 1 | 1 | 1 |
| | P2 | 20 2 | 2 | | SZ | Tα | TRC | | | P2 | 20 2 | 2 | P2 | 20 2 | 2 | 2 |
| | P3 | 30 3 | 3 | | | | B TRC | | | P3 | 30 3 | 3 | P3 | 30 3 | 3 | 3 |
| | P4 | 40 4 | 4 | | | LSB | | BR | BR | P4 | 40 4 | 4 | P4 | 40 4 | 4 | 4 |
| | P5 | 50 5 | 5 | SR | ESP | | CP B | BV | BV | P5 | 50 5 | 5 | P5 | 50 5 | 5 | 5 |
| | P6 | 60 6 | 6 | | SP | | | BB | BB | P6 | 60 6 | 6 | P6 | 60 6 | 6 | 6 |
| LE | P2 | 70 7 | 7 | | | | B CP TRC | CP | CP | P7 | 70 7 | 7 | P7 | 70 7 | 7 | 7 |
| J | | 80 8 | 8 | | | L1 | | R | R | J | 80 8 | 8 | J | 80 8 | 8 | 8 |
| RECORDING | P1 | 90 9 | 9 | | | L1 TN | R B | Z1 = | Z1 = | L | 90 9 | 9 | L | 90 9 | 9 | 9 |
| | P2 | 100 10 | 160 | | | L1 Tα | | Z1 < | Z1 < | | 100 10 | 160 | | 100 10 | 160 | J |
| | P3 | 110 11 | 176 | | | | R B TRC | Z2 ov | Z2 ov | | 110 11 | 176 | | 110 11 | 176 | K |
| | P4 | 120 12 | 192 | | | L2 | | Z3 ov | Z3 ov | TP | 120 12 | 192 | TP | 120 12 | 192 | L |
| | P5 | 130 13 | 208 | | | L2 TN | | Z3 = | Z3 = | | 130 13 | 208 | | 130 13 | 208 | M |
| | P6 | 140 14 / N | 224 / N | | | L2 Tα | | Z3 < | Z3 < | N | 140 14 / N | 224 / N | N | 140 14 / N | 224 / N | N |
| LE | P3 | 150 15 | 240 | | | | R TRC B CP | CR | | CB | 150 15 | 240 | CB | 150 15 | 240 | / |
| 18 | | 19 | 20 | 21 | 22 | 23 | 24 | 25 | 26 | 27 | 28 | 29 | 30 | 31 | 32 | CEL |

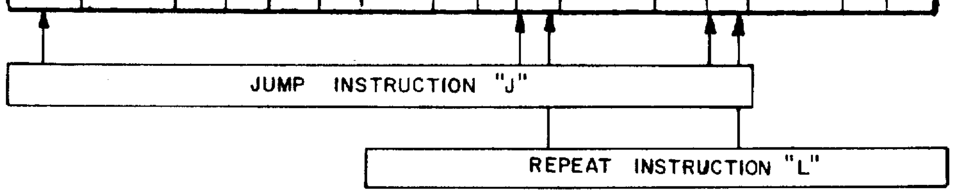

INVENTOR.
FABRIZIO SALTINI

Fig. 3b

INVENTOR.
FABRIZIO SALTINI

STORED PROGRAM ELECTRONIC COMPUTER USING MACROINSTRUCTIONS

CROSS REFERENCE TO RELATED APPLICATION:

The disclosure of copending U.S. Ser. No. 783,894 filed on Dec. 16, 1968 now U.S. Pat. No. 3,585,600 is incorporated herein by reference.

BACKGROUND OF THE INVENTION

1. Field of the Invention

This invention relates generally to improvements in stored-program electronic computers and more particularly to improvements in computers which execute instructions grouped in fixed length macroinstructions.

2. Description of the Prior Art

U.S. Patent application Ser. No. 783,894 , which was filed on Dec. 16, 1968, now U.S. Pat. No. 3,585,600, issued June 15, 1971, and is assigned to the assignee of the present invention, teaches a computer in which the program and data are stored in an external bulk memory, in this case a magnetic tape unit. The instructions of the program are grouped in fixed length macroinstructions and the macroinstructions are transferred one at a time to a fast, relatively small internal memory, in this case a delay line memory, for being serially executed.

Each macroinstruction contains an instruction for selecting one of a plurality of the instructions in the bulk memory for being transferred to the internal memory. The particular macroinstructions transferred depends on whether or not selected jump conditions have occurred.

The internal memory of the aforementioned computer also contains a data portion for receiving from the external memory data to be operated upon. The data portion may be divided into any desired group of zones to receive different length segments of data. A "long section" containing a plurality of these zones may be established in the data portion so that several segments of data may be transferred between the data portion and the external memory in a single operation.

The aforementioned computer affords great programming flexibility but some problems still exist. When performing rather complex arithmetic operations, such as the calculating of trigonometric functions of numbers, it is necessary to extract macroinstructions, one at a time, from the external memory. This requires a relatively large amount of time and substantially slows the operational speed of the computer.

Furthermore, in carrying out these relatively complex arithmetic operations, portions of the macroinstruction dealing with paper movement control, checking for jump conditions, etc., are not used in most of the macroinstructions executed to carry out the operations. In the aforementioned computer however, because all macroinstructions are of a fixed length, they contain places for all the constituent instructions. The processing of these unused portions of the macroinstructions also contributes to the time required to perform the operation.

SUMMARY OF THE INVENTION

It is therefore an object of the invention to increase the operating speed of electronic computers using macroinstructions.

It is a further object of this invention to increase the operating speed of electronic computers by providing means for extracting a plurality of macroinstructions from the external memory at one time.

It is a further object of this invention to increase the operating speed of electronic computers executing programs made up of instructions grouped into macroinstructions by eliminating unused portions of the macroinstructions.

In carrying out these and other objects of this invention there is provided a computer for serially executing a program comprising a series of macroinstructions each made up of a plurality of instructions arranged in a predetermined order and having a first memory for storing the macroinstructions, an operational memory and means for transferring macroinstructions serially from the first memory to a predetermined portion of the operational memory and for transferring information between a selected area of the operational memory and the first memory and further comprising first means for interpreting and executing the instructions contained in the macroinstruction stored in the predetermined portion of the operational memory and second means responsive to the interpretation of a predetermined instruction in the macroinstruction being executed for causing the interpreting and second executing means to serially interpret and execute as macroinstructions the information stored in the selected area. Also provided are means responsive to a first signal recorded at a selected position in the selected portion of the operational memory for causing the interpreting and executing means to interpret the following information as a macroinstruction and responsive to the interpretation of a second signal in the predetermined portion for interpreting the following information as a macroinstruction beginning with an instruction later than the first instruction of a macroinstruction.

Various other objects, advantages and features of this invention will become more fully apparent in the following specification with its appended claims and accompanying drawings in which:

BRIEF DESCRIPTION OF THE DRAWINGS

FIG. 3 shows how FIGS. 3*a* and 3*b* are to be composed

FIGS. 3*a* and 3*b* show the format of a number of macroinstructions which control the operation of the computer;

DETAILED DESCRIPTION OF THE INVENTION

This invention can best be understood from the following detailed description of the illustrated embodiment.

GENERAL DESCRIPTION

The invention relates to an electronic computer with an internal programme formed by blocks of instructions, or macroinstructions, each of which contains instructions controlling internal and external operations in the sequence most suitable for processing the information appearing in a given account document.

Figure 1:
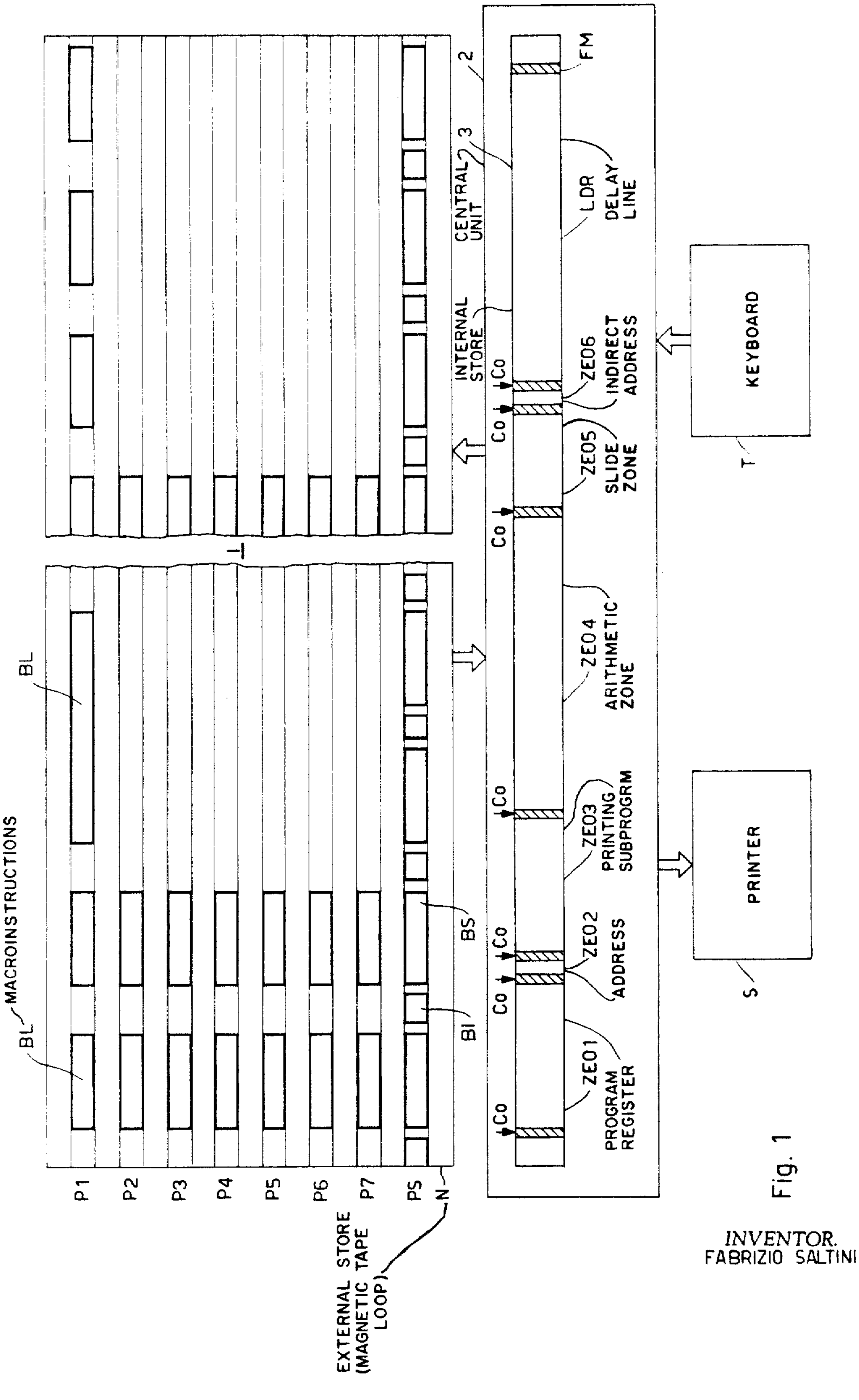
FIG. 1 shows diagrammatically the main parts, especially the magnetic-tape memory, of the illustrated embodiment of the computer according to the invention.

FIG. 1 shows the basic system formed by an external memory 1 including a magnetic tape loop N, which contains data and a programme, a central unit 2 which processes and carries out the individual macroinstructions after transferring them to the internal memory 3, which in the illustrated embodiment of the invention may be a delay line memory, a printer S and a keyboard T. This basic system may be extended by adding whatever peripheral units are desired.

The external store N is formed by a loop of magnetic tape on which the items of information are recorded in series on tracks P1 – P7. Locations on the tracks can be identified by means of addresses B1 recorded on a service track PS at predetermined intervals. Each address identifies the beginning of a block BL on each track. A service program for governing the internal functions of the computer may be recorded between the addresses on the service track PS.

Each reading or recording order produces the advance of the tape N for identification of the block BL and the reading or recording of the addressed block; the end of a block is followed by stopping of the movement of the tape N.

The programme recorded on the tape N is composed of macroinstructions in dislocated (randomly disposed from track to track) arrangement in the memory 1 in accordance with a sequence of addresses which minimises the access time to the individual blocks BL in the processing phase. During the execution of the programme, the macroinstructions are read and transferred, one at a time, from the tape N to a predetermined portion, ZE01, of the memory 3 of the central unit 2, which portion is capable of containing one macroinstruction at a time.

A macroinstruction may contain an instruction for causing the transfer of information between the tape memory N and a selected portion of the internal memory 3. The information transferred may be of any desired length and may require a portion of the tape memory which encompasses a plurality of service track addresses.

Each macroinstruction contains a portion which addresses one of a plurality of the macroinstructions stored on the tape memory to be next transferred to the internal memory. The particular macroinstruction chosen is determined with reference to internal and external conditions.

THE INTERNAL DELAY-LINE STORE

The internal memory 3 (FIG. 1), may be formed by a single magnetostrictive delay line LDR which stores the bits of information in series. The delay line is closed on registers of bistable type which convert groups of six bits of information corresponding to a character from series to parallel and from parallel to series. Each character is formed by two tag bits and four information bits, which latter bits are operated on in parallel at each period of a character generated every six bit periods.

The memory LDR 3 contains a number of fixed zones of predetermined capacity and position. The remainder may be subdivided into zones of variable length. The zones are adjacent to one another and each of them contains $n$ cells CL – Cn (with $n$ variable from zone to zone as hereinafter described) each for storing a character, plus a leading cell Co identifying the beginning of the zone.

Each cell is formed by six binary places B1 – B6. The first place B1 is used to contain a beginning-of-zone bit B1 which has the function of zone indicator, being equal to one only in the leading cell CO. The second place B2 is used to contain a marker bit B2 which identifies an individual cell during certain operations in order to distinguish it from the adjacent cells, this bit B2 being equal, within each zone, to one in the cell to be identified. The remaining places B3 – B6 contain the four information bits B3 – B6 which are differently interpreted depending on the cell and the zone containing them, as specified hereinafter.

The subdivision of the store LDR into zones is effected by a succession of operations which begin, upon the switching on of the machine, with the creation of a first zone with a length of 1 + 32 cells defined by two beginning-of-zone bits B1 disposed in the first and thirtyfourth cells, respectively, and the writing of an end-of-store character FM located in the last cell of the memory 3.

In consequence of the initial conditions which are created upon switching on, a "memory division" macroinstruction located at a fixed address of the tape memory N is transferred to the first zone.

The execution of this initial division macroinstruction produces the division of the delay line LDR into the following zones (FIG. 1):

Programme zone: ZEO1 with a length of 1 + 32 cells (the first is the leading cell CO) and intended to receive the successive macroinstructions of the programme one at a time. The macroinstruction transferred from time to time from the tape memory N to the zone ZEO1 is then automatically carried out, as will be seen hereinafter.

Address zone: ZEO2 with a length of 1 + 2 cells which are used to store a two-character address.

Printing subprogramme zone: ZEO3 with a length of 1 + 32 cells, in which zone there is stored a block containing instructions and data having the function of a printing subprogramme.

Arithmetical zone: ZE04 with a length of 1 + 64 cells, which represents a pair of 32 character arithmetical registers for carrying out computation operations. The two registers, A and B, are interlaced character by character.

Slide zone: ZEO5 which may have a length of from 1 + 3 to 1 + 15 cells and which is used to receive the digital data entered from the keyboard.

Indirect address zone: ZEO6 with a length of 1 + 3 cells which are used to contain a three-character address.

The remaining portion of the memory LDR is left undivided by the effect of the performance of the initial division macroinstruction.

At any point during the execution of a programme, it is moreover possible to insert further division macroinstructions, whose execution produces the subdivision of the remaining portion (whether this is still undivided or already divided) into zones which may contain alphabetical and numerical data or a plurality of macroinstructions as will be described later. The division macroinstructions may split the remaining portion into a number of zones less than or equal to 153, the length of each zone and the number of zones being determined by the macroinstruction itself.

Each data zone may be intended to contain numerical or alphabetical characters. A numerical or alphabetical character occupies one or two adjacent cells, respectively, of the memory LDR.

The numerical information therefore engages as many memory cells as there are digits of which the information is composed, plus one leading cell. The alphabetical information, on the other hand, occupies as many pairs of memory cells as there are characters plus two leading cells. The distinction between numerical zones and alphabetical zones is therefore determined by the fact that the first have only one leading cell, while the second have two leading cells. Alphabetical zones can contain numerical as well as alphabetical characters.

In the programme zone ZEO1 and in the address zones ZEO2 and ZEO6, the leading cell CO contains the sole beginning-of-zone bit B1 = 1, while the following cells each contain, in the bit places B3 – B6 a character which indicates a function or part of an address in the internal binary code.

In the arithmetic zone ZEO4 and in the slide zone ZEO5, the leading cell CO may contain, in addition to the beginning-of-zone bit B1 = 1, a bit B6 = 1 for indicating the minus sign of the operand contained in the same zone, while the other cells may contain binary coded decimal digits.

In the printing subprogramme zone ZEO3, the leading cell contains the beginning-of-zone bit B1 = 1, while the following cells contain characters in the internal code or in any other code according to printing requirements.

In each of the numerical data zones, the leading cell CO contains the beginning-of-zone bit B1 = 1. The three binary positions B3 – B5 may contain a zone code for indicating that the zone has been engaged for an internal or external transfer. The binary place B6 may contain a bit B6 = 1 for indicating the minus sign of the number contained in the zone.

In each of the alphabetical data zones, the first leading cell, in which the bits B1, B3, B4 and B5 are used as in the numerical data zone, is followed by a second leading cell with the bit B1 = 1. The following pairs of cells of the alphabetical zone may contain numerical and alphabetical characters in a seven bit per character code.

The identification of the zones in addressing the memory LDR takes place by counting the beginning-of-zone bits B1. The two consecutive bits B1 present at the beginning of each alphabetical zone are counted as a single bit.

The data zones of the memory LDR may moreover be marked by an operation code which is written in the leading cell. The recording of an operation code at the beginning of a zone indicates that the zone is to be used in a particular type of operation. These are four zone operation codes:

Internal operations code, used for identifying zones to be used for transfers between internal devices of the computer;

Printing code, used for the zones intended for printing;

Keyboard code, used for the zones intended to receive characters from the keyboard;

External operations code, used to identify the zones to be used for transfers from or to the tape memory or from or to other peripheral units.

In transfers of a macroinstruction or a printing subprogram from the tape memory to the zones ZE01 or ZEO3, respectively, of the memory LDR, an external operation code is not necessary for identifying said zones. In all other transfers from the memory LDR to the tape memory or vice versa, an external operation code is used to indicate both the beginning and the end of the part of the memory LDR which is concerned in the transfer. The use of this pair of operation codes defines in the memory LDR a long section which may comprise one or more zones, that is all the zones included between the two operation codes. The end of a long section is defined by the operation code or leading code which is recorded in the CO of the following zone.

Figure 2A:
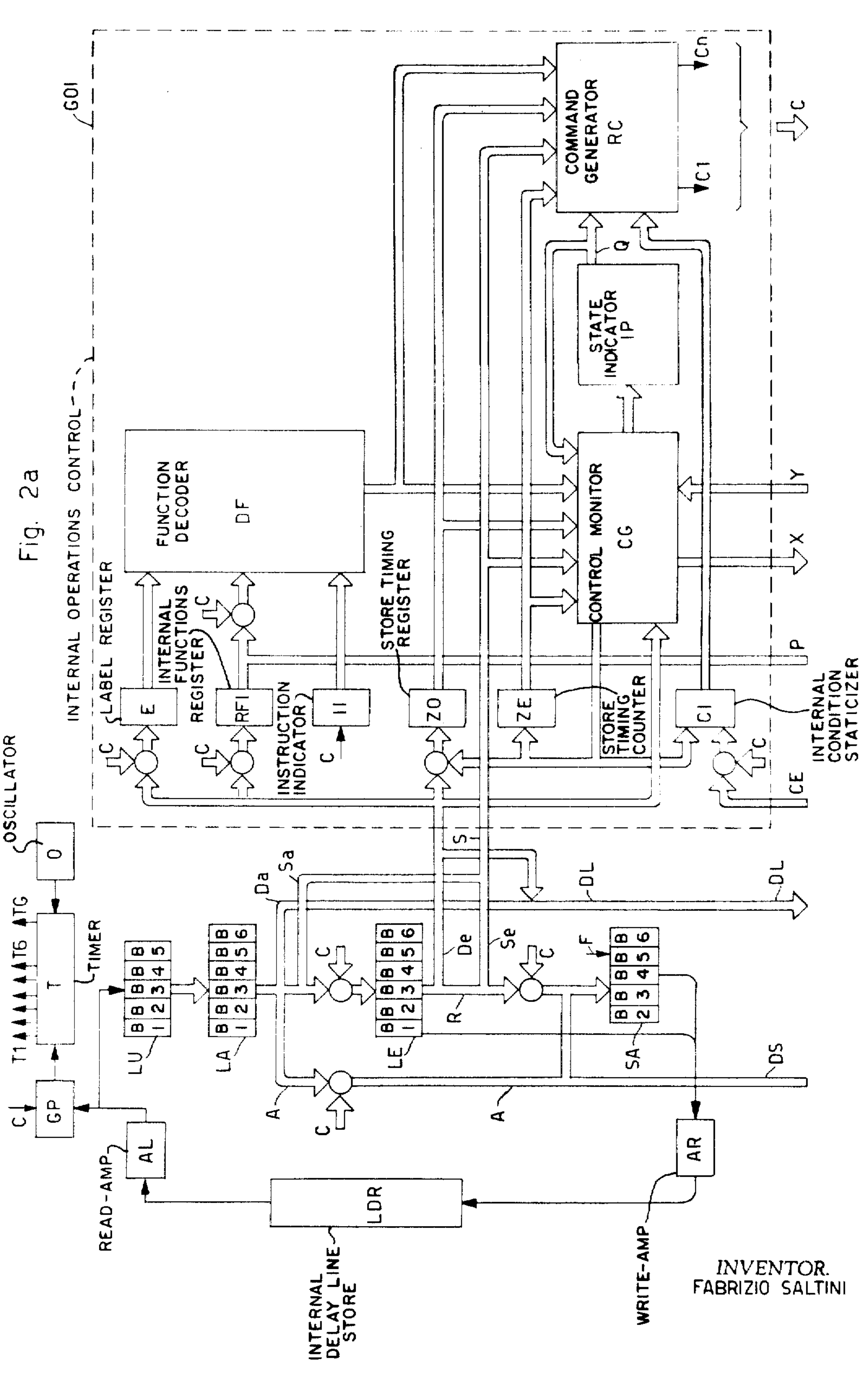
FIGS. 2*a* and 2*b* are more detailed block diagrams of the computer.

Referring now to FIG. 2 of the drawings, the delay line memory LDR, which can be divided into a number of zones as hereinbefore described, is provided with a reading transducer feeding a reading amplifier AL and with a writing transducer fed by a writing amplifier AR, between which amplifiers there is interposed a group of four registers LU, LA, LE, SA for the circulation of the data contained in the store.

A timing circuit T, strobed by an oscillator O which is synchronized on the reading of the first bit of the contents of the store, cyclically generates six successive pulses T1 – T6 which identify six successive bit periods during which the six bits of a character are respectively made available at the output of the amplifier AL, and also generates a pulse TG every sixth pulse concurrently with pulse T6.

Under the control of the timing device T, the first five bits B1 – B5 of each character which leave the amplifier AL during the pulses T1 – T5 respectively are stored in the five bistable devices of the register LU. They are then transferred, simultaneously with the output of the sixth bit B6 during the pulse T6, to the register LA, so that the register LA receives in parallel all the six bits B1 – B6.

On the next pulse TG, the contents of the register LA are transferred to the register LE. The same pulse TG transfers the bit B1 contained in the first bistable device of LE to the writing amplifier AR and the other bits B2 – B6 contained in the remaining bistable of LE to the five bistable devices of the register SA. From the register SA, the bits B2 – B6 are delivered in order to the amplifier AR at the times defined by the pulses T1 + T5 respectively.

In this way, at each pulse TG, a certain character leaving the store LDR is introduced into the register LA and remains available therein until the following pulse TG, which transfers it to the register LE, where it remains available until the following pulse TG. Therefore, while a character is available in the register LA, the character which immediately precedes it in the delay line is available in the register LE. This makes it possible to operate on two adjacent characters in the memory LDR simultaneously. In particular, while the character to be transferred from the memory LDR to the other internal units of the computer is normally taken from the register LE, in the case where, for example, double characters representing an alphabetical character are to be extracted, one of the two component characters is taken from the register LA and the other from the register LE.

The contents of a generic cell of the memory LDR may be erased by preventing the transfer thereof along the channel R from the register LE to the register SA, they may be modified by preventing the transfer thereof from the register LE to the register SA along the channel R and, at the same time, permitting the input into SA of information coming from the internal registers of the computer through the channel DS, they may be shifted in advance by one place by transferring the register LA to the register SA through the channel A instead of the register LE, and, finally, they may be shifted with a delay by a prefixed number of cells by blocking the input and output of the register LE and transferring the register LE to the register SA only after the prefixed number of digit periods has elapsed.

Each register LA, LE moreover respectively feeds the pair of channels S*a*, D*a* and S*e*, D*e*. The tag bits B1, B2 and the information bits B3 – B6, of the characters present in the registers LA and LE are transferred via the channels Sa, Se and Da, De, respectively, from the registers LA, LE to the other internal units of the computer.

DESCRIPTION OF THE BLOCK DIAGRAM OF THE COMPUTER

The interpretation and execution of each macroinstruction is controlled by sequencing devices which provide for transferring the successive macroinstructions from the tape memory to the programme zone ZE01 of the memory LDR and, thereafter, for interpreting and executing the individual instructions contained in the transferred macroinstruction.

In particular, the following sequencing devices are provided (FIGS. 2*a* and 2*b*):

- internal operations control GO1
- printing control GOS;
- keyboard control GOT;
- paper services control GSC;
- other controls for each of the peripheral units which are added as necessary.

The internal operations control GO1 controls the performance of the internal operations, that is those operations which do not involve peripheral units, with the exception of the tape memory N. Moreover, this control supervises all of the remaining controls.

Figure 2B:
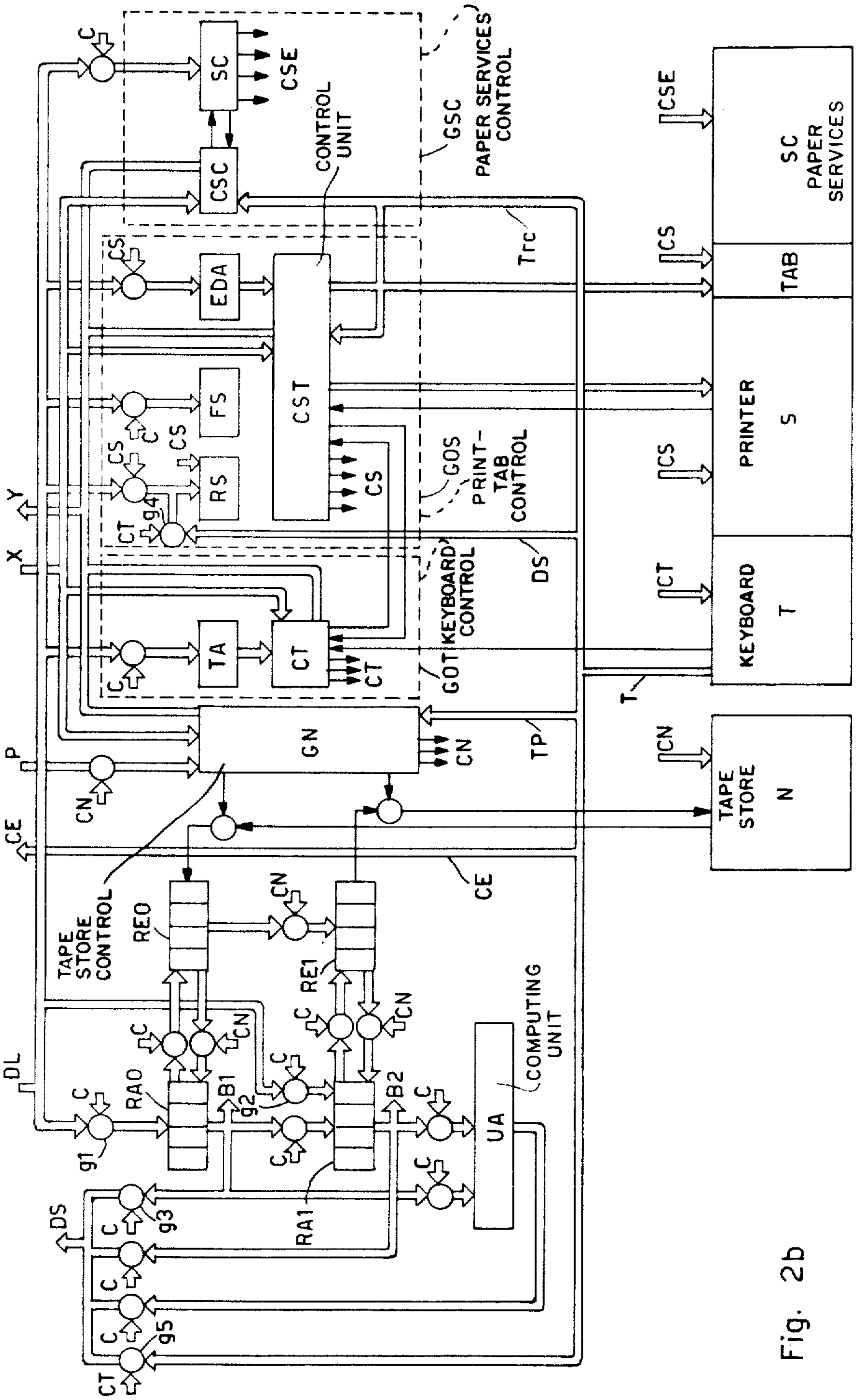

The internal operations control GO1 is composed of (FIG. 2*a*):

- a register E ("label register") to which there is transferred the first character of the macroinstruction in process of execution at the moment. This first character has the function of a label in the sense that it indicates in what way the following characters of the macroinstruction are to be interpreted. The label character remains in the register E for the whole of the time necessary for interpreting and carrying out the corresponding macroinstruction.
- an instruction indicator II which indicates at any instant which cell of the programme zone ZEO1 contains the first character of the instruction under execution at the moment.
- an internal functions register RFI to which the function character of an internal instruction to be carried out is transferred. This function character remains stored in the register RFI throughout the time required for interpreting and executing the instruction.
- a function decoder DF constituted by a logic network which decodes the contents of the label register E, the instruction indicator II and the function register RFI and which supplies an indication of the function corresponding to the current internal instruction.
- a counter ZE for the fixed zones ZEO1 – ZEO6 of the memory LDR, which indicates, at each reading cycle of the memory, the presence in the register LE of the characters contained in the cells of each of the said zones. The counter ZE supplies a continuous signal to the remaining units of the computer at a separate output for each of the first six memory zones, this continuous signal lasting, within the limits of each memory cycle, for the whole of the time required for reading the corresponding zone.
- a register ZO which indicates the presence of an operation code recorded in the leading cell of a zone while a character of that zone is present in the register LE. The register ZO has a group of outputs each of which corresponds to an operation code and remains energized during each memory cycle for the whole of the time required for reading the memory zone headed by the corresponding code.
- a group of internal-condition storing bistable devices CI which, for example, indicate the results of the examination of memory zones and the presence of a number of jump conditions.
- a control monitoring unit CG constituted by a logic network which receives the outputs of the function decoder DF, the timing register ZO, the timing counter ZE, the channel S which is the sum of the channels S*a* and S*e* and, through the channey Y, the outputs of the condition indicators of the peripheral controls GOT, GOS and GSC which indicate the state of availability of these controls (FIG. 2*b*). On the basis of this information, the logic network CG monitors the timing counter ZE and the timing register ZO and the internal condition bistable devices CI. Moreover, the logic network CG transfers the indications given by the counter ZE and the register ZO to the peripheral controls on the channel X and commands a succession of states which characterize the operation of the computer.

To this end, the logic network CG controls a unit IP indicating states P and which comprises as many bistable devices P1 . . . Pn as there are possible states P1 . . . in which the computer may be.

Each bistable device remains set for the duration of the corresponding state. The unit IP supplies an indication of the present state to the logic network CG through the channel Q. The state indicator IP is switched from one state to the following one by a signal from the logic network CG which acts on the basis of the indications which it receives the various units of the computer.

A command generating logic network RC, which receives inputs from the instruction decoder DF, the store timing register ZO, the memory timing counter ZE, the internal condition staticiser CI, and the state indicator IP and also receives indications relating to the position of the tag bits B1 and B2 in the memory LDR and over the channel S, generates commands C1 – Cn which control the succession of operations in the various units.

The commands may be, for example:

Reading commands, which, for instance, transfer information from the registers LE, LA to the registers RAO and RAI, in which case the relative commands act by opening the gates $g^1$ and $g^2$ (FIG. 2*b*).

Writing commands, which for example transfer information from the register RAO to the register SA, in which case the commands act by opening the gate $g^3$.

Driving commands for the bistable devices which store the internal conditions, in which case the commands act by setting the bistable devices contained in the CI.

Commands for writing characters and tag bits in the memory LDR, in which case the commands act directly on the register SA through the channel F.

The internal operations control GOI controls, for example, the following instructions: internal transfers between zones of the memory LDR carried out through the channel DL connecting the register LE to the register RA1 and the channel DS connecting the register RA1 to the register SA; arithmetical operations carried out by transferring simultaneously to the registers RAO, RA1 two digits taken from the respective registers LA, LE, arithmetically processing the two digits in the computing unit UA and thereafter transferring the result of the arithmetical operation to the writing register SA; data-zone heading operations, by generating commands for writing an operation code in the leading cell of the addressed zone through the medium of the register SA; transfers between the memory LDR and the tape memory N carried out through the channels connecting the register LE to the registers RAO, RA1, the registers RAO, RA1 to the registers REO, RE1 and the registers REO, RE1 to the tape memory N.

Transfers between the memory LDR and the memory N engage, in addition to the internal operations control GOI, the tape memory control GN which provides for controlling the tape driving device, selecting the track addressed, searching for the block within the track and synchronising the exchange of signals between the two memories which is carried out through the buffer formed by the registers RAO, REO and REI.

Under the control of the internal operations control GOI there are transferred to the keyboard control GOT, the printing-tabulation control GOS, the paper services control GSC, etc., the instructions contained in the macroinstruction and relating to the channels controlled by these controls. These instructions in turn control the flow of data along the channels connecting the keyboard and the printer, respectively, to the computer or actuate mechanical controls pertaining to the paper services.

The keyboard control GOT receives in the register TA those characters of the macroinstruction which control the selection of a keyboard of the computer and times by means of a control unit CT the transfer of characters through the gate $g4$ from the selected keyboard T to the printing register RS for direct printing, or through the gate $g5$ to the register SA for the writing of the characters in that zone of the store LDR previously marked with the keyboard operation code.

The paper services control GSC receives in a register SC the characters of the macroinstruction which select a given paper control, prearrange the feed of the paper and operate under the control of the control unit CSC the mechanical devices which effect the movement of the various sheets, such as separate forms, continuous forms, etc., in the printer S.

The printing-tabulation control GOS is activated in two successive stages of the reading of the macroinstruction. In horizontal tabulation operations of the printing head of the printer S, the tabulation address contained in the macroinstruction is transferred to the register RS and is thereafter transmitted, on command of the control unit CST, to the mechanical selection devices which control the carrying out and the stopping of the tabulating movement.

For carrying out the printing, the register FS of the printing control GOS receives those characters of the macroinstruction which control the printing and define the methods of printing.

The contents of the register CST may specify one of the following methods of printing:

- Direct numerical printing from the memory LDR.
- Numerical printing from the memory LDR with elimination of the zeros to the left of the first significant digit.
- Numerical printing from the memory LDR with replacement of the zeros to the left by asterisks.
- Printing with control of horizontal format of the line.
- Printing with control of the horizontal format of the line and with replacement of the zeros to the left by asterisks.
- Alphabetical and numerical printing from the memory LDR.
- Alphabetical and numerical printing from the keyboard.

In the case of printing from the memory LDR, the control GOS controls by means of the unit CST, which generates signals CS, the transfer of individual characters from the zone of the memory LDR headed by the printing operation code to the register RS. These characters are then transmitted one at a time to the printing device of the printer S.

In numerical printing, the control GOS moreover provides for the elimination of the zeros to the left and for their replacement by asterisks on indication by the control unit CST.

In the case of printing with control of the horizontal format of the line, the control GOS provides by means of the control unit CST for transferring the individual characters of the printing subprogramme block to the register EDA. Under the control of these characters, there is then effected the transfer to the register RS of the characters extracted from the memory zone with the leading printing code, or from the same zone ZEO3 which contains the printing subprogramme. The characters are then transmitted to the printing device.

In the case of printing from the keyboard, the control GOS provides for accepting from the keyboard the characters which are to be printed. The characters are stored in the register RS and are thereafter transmitted to the printing device of the printer S.

THE NORMAL MACROINSTRUCTION

The NORMAL macroinstruction, the format of which is shown in FIG. 3, contains the instructions which control the operation of the basic system formed by the computer, the tape memory N, the printer S and the keyboard T. This macroinstruction is formed by 32 places each containing a character with four bits of information.

The following characters correspond to the 32 places of the macroinstruction:

Place 1: label character of the macroinstruction. This character differentiates the various macroinstructions, indicating the way in which the following characters of the macroinstruction are to be interpreted.

Place 2 – 3: characters expressing as a whole one of the 255 horizontal tabulation addresses of the movable printing device.

Place 4: character which selects one or more paper controls of the paper services control from among the following four controls:

Right-hand platen control — code symbol RD.

Left-hand platen control — code symbol RS.

Lower feed control — code symbol TI.

Upper feed control — code symbol TS.

Place 5: character which prearranges a jump of the paper by selecting one of the tracks of a paper jump device which determines the stopping of the jump and by positioning predetermined mechanical jump elements. Each end-of-jump device may be formed by a loop of plastic sheet material which moves in synchronism with the form to be printed and which contains four selectable tracks ahving holes spaced from one another according to the length of the jump.

The eight code symbols of place 5 of the macroinstruction may have the following significance:

SCI 1 = Lower feed means, track 1
SCI 2 = Lower feed means, track 2
SCI 3 = Lower feed means, track 3
SCI 4 = Lower feed means, track 4
SCI 1 = Upper feed means, track 1
SCI 2 = Upper feed means, track 2
SCS 3 = Upper feed means, track 3
SCS 4 = Upper feed means, track 4

Place 6: character which controls the following functions in the selected paper control:

Opening of the feed rollers and line-spacing. Code symbol AR-INT.

Opening of the rollers for introducing accounting cards. Code symbol AR.

Prearrangement of the line-spacing and storing of the command "Return to beginning" for effecting line-spacing when this is ordered from the keyboard or from the store LDR. Code symbol TRC-INT.

Prearrangement of the line-spacing and of the opening of the rollers and storing of the return-to-beginning command, for effecting return to the beginning with a paper jump when this is ordered from the keyboard or from the store LDR. Code symbol TCR-AR-I.

Places 7–8–9: a function character is stored in place 7 and the address of the generic zone Z1 in places 8–9. The functions which can be coded in place 7 are as follows:

◇ — transfer of the zone Z1 to the register B of the arithmetical zone ZEO4.

* — transfer of the zone Z1 to the register B of the arithmetical zone ZEO4 and zeroising of the zone Z1.

|◇| — transfer in absolute value of the zone Z1 to the register B of the zone.

|*| — transfer in absolute value of the zone Z1 to the register B of the arithmetical zone ZEO4 and zeroising of the zone Z1.

◇ USP — transfer of the zone Z1 to the register B of the arithmetical zone ZEO4 and prearrangement of the zone Z1 for printing with the writing of the printing operation code in the leading cell of the zone Z1.

|◇ USP| — transfer in absolute value of the zone Z1 to the register B of the arithmetical zone ZEO4 and prearrangement of the zone Z1 for printing with the writing of the printing operation code in the leading cell of the zone Z1.

USP — Prearrangement of the zone Z1 for printing with the writing of the printing operation code in the leading cell of the zone Z1.

Ma — Prearrangement for entry from the keyboard in the zone Z1 with the writing of the keyboard operation code in the leading cell of the zone Z1.

C — Transfer of the constant contained in places 8–9 of the macroinstruction to the register B of the arithmetical zone ZEO4.

* USP -Transfer of the zone Z1 to the register B of the zone ZEO4, prearrangement of the zone Z1 for printing with the writing of the printing operation code in the leading cell of the zone Z1 and erasure of said zone Z1 after execution of the printing.

|* USP| — Transfer in absolute value of the zone Z1 to the register B of the arithmetical zone ZEO4, prearrangement of the zone Z1 for printing by writing the printing operation code in the leading cell of the zone Z1 and erasure of said zone Z1 after the execution of the printing.

Places 10–11–12: a function character is stored in place 10 and the address of a generic zone Z2 in places 11-12. The following functions can be coded in cell 10:

+ — Transfer of the zone Z2 to the register A of the arithmetical zone ZEO4, addition A+B of the two arithmetical registers and result to the zone Z2.

– — Transfer of the zone Z2 to the register A of the arithmetical zone ZEO4, subtraction A+B of the two arithmetical registers and result to the zone Z2.

|+| — Transfer of the zone Z2 to the register A of the arithmetical zone ZEO4, addition of the absolute values |A|+|B| of the two arithmetical registers and result to the zone Z2.

|–| — Transfer of the zone Z2 to the register A of the arithmetical zone ZEO4, subtraction of the absolute values A - B of the two arithmetical registers and result to the zone Z2.

x — Multiplication of the number located in the register B of the arithmetical zone ZEO4 by the number located in the zone 2 and result to the register A of the arithmetical zone ZEO4.

↑ — Transfer of the zone Z2 to the register A of the arithmetical zone ZEO4.

USP — Prearrangement of the zone Z2 for printing with the writing of the printing operation code in the leading cell of the zone Z2.

Ma — Prearrangement for entry from the keyboard in the zone Z2 with the writing of the keyboard operation code in the leading cell of the zone Z2.

CL — Prearrangement for the exchange of date between the store LDR and the tape store with the writing of the leading external operations code in the leading cell of the first zone of the long section.

Places 13–14–15: A function character is stored in place 13 and the address of the generic zone Z3 in places 14–15.

The following functions can be coded in cell 13:

+ — Transfer of the zone Z3 to the register A of the arithmetical zone ZEO4, addition A+B of the two arithmetical registers and result to the zone Z3.

|+| — Transfer of the zone Z3 to the register A of the arithmetical zone ZEO4, addition of the absolute values |A| + |B| of the two arithmetical registers and result to the zone Z3.

– – Transfer of the zone Z3 to the register A of the arithmetical zone ZEO4, subtraction A–B of the two arithmetical registers and result to the zone Z3.

|–| — Transfer of the zone Z3 to the register A of the arithmetical zone ZEO4, subtraction of the absolute values A — B of the two arithmetical registers and result to the zone Z3.

↓ — Transfer of the register A of the arithmetical zone ZEO4 to the zone Z3.

÷ — Transfer of the zone Z3 too the register A of the arithmetical zone ZEO4. Division A/B of the numbers contained in the two registers of ZEO4 and result to the zone Z3.

SS <— Investigation of the sign of the zone Z3 and storing of the result.

USP — Prearrangement of the zone Z3 for printing with the writing of the printing operation code in the leading cell of the zone Z3.

Ma — Prearrangement for entry from the keyboard in the zone Z3 with the writing of the keyboard operation code in the leading cell of Z3.

CL — Prearrangement for the exchange of data between the store LDR and the tape store with the writing of the leading external operations code in the leading cell of the zone following the last zone of the long section.

Place 16: character which specifies the number of places that the result of an arithmetic operation must be shifted, either to the right or to the left, in being transferred back to zone Z3. In division operations it provides for the carrying out of the division to a greater number of significant digits.

Place 17: character which prearranges the length of the slide zone ZEO5 for controlling the entry capacity of the numerical keyboard. The prearrangement is effected by shifting the beginning-of-zone bit B1 with respect to the end-of-zone bit.

Places 18–19–20: Characters which define the functions of transfer between the memory LDR and the magnetic tape memory.

The character in place 18 indicates the track containing the block to be operated on and the characters in places 19–20 indicate the address of the block within the track.

The character located in cell 18 moreover may indicate one of the following functions:

Reading of the tape memory on one of the six tracks P1 – P6 starting from the block addressed in cells 19–20 and transferring the information to the zone of the long section of the memory LDR.

Recording on one of the six tracks P1 – P6 of the tape starting from the block address defined by the contents of the cells 19–20, where the long section of the memory LDR is transferred.

Reading of the printing subprogramme block located in track 7 in the tape at the block address indicated in cells 19–20 and transfer of this block to the zone ZEO3 of the memory LDR which is used to contain the printing subprogramme.

Place 21: printing function character providing selection of the colour black or red. Code symbols SN, SR.

Place 22: character for selecting the method of printing:

Direct printing of the selected zone of the memory LDR with elimination of zeros to the left. Code symbol SZ.

Direct printing of the selected zone of the memory LDR with replacement of the zeros to the left by asterisks. Code symbol SP.

Printing with control of format in accordance with the instructions of the printing subprogramme block contained in the zone ZEO3 of the store LDR. Code symbol E.

Printing with control of format in accordance with the instructions of the printing subprogramme block and replacement of the zeros to the left by asterisks. Code symbol ESP.

Places 23–24: character for selecting the two keyboard lamps L1 and L2 of the following machine keyboards:

Numerical keyboard. Code symbol Tα.

Symbol keyboard. Code symbol LSB.

Actuating keys. Code symbol B.

Return-to-beginning key. Code symbol TRC.

Programme keys. Code symbol CPB.

Transfer key. Code symbol RB.

Place 25: Character which causes the checking of one of the following jump conditions and a jump if the selected condition has occurred:

1. Red-bar actuating key. Code symbol BR.
2. Green-bar actuating key. Code symbol BV.
3. Blue-bar actuating key. Code symbol BB.
4. Programme key. Code symbol CP.
5. Transfer key. Code symbol R.
6. Zone Z1 = 0. Code symbol Z1=.
7. Zone Z1 =0. Code symbol Z1.
8. Overflow to zone Z2. Code symbol Z2 OV.
9. Overflow to zone Z3. Code symbol Z3 OV.
10. Zone Z3 = 0. Code symbol Z3=.
11. Zone Z3 <0. Code symbol Z3 <.
12. Condition stored by the instruction of place 26. Code symbol CR.

Place 26: Character which causes a jump if a selected one of the above listed jump conditions has occurred previously in the program.

Place 27–28–29–30–31–32: Characters which address the macroinstruction block following the current macroinstruction block being executed and cause the transfer thereof to the programme zone ZE01 in the memory LDR. One of the two groups of characters located in places 27–28–29 and 30–31–32, respectively, of the macroinstruction is selected depending on whether a jump condition specified in Places 25 or 26 has occurred or not occurred respectively. Each of the two groups of characters controls the reading of a block located on one of the seven tracks P1 – P7 of the tape store, the address of the track being defined by the character located in places 27 and 30 and the address of the block being defined by the characters located in places 28–29 and 31–32 of the macroinstruction.

MEMORY DIVISION MACROINSTRUCTION

The memory division macroinstruction is the first macroinstruction of the programme.

Successive divisions of the memory LDR may take place during the development of the programme in order to adapt the capacity of or the number of the zones to the various processing phases.

The division macroinstruction is a block of 32 cells which contain the following characters:

Place 1: Division label-character.

Place 2: Character indicating whether the division requires erasure of the memory.

Place 3: Non significant character which is always zero

Places 4–5: Character which defines the address of that zone of the memory LDR from which the division begins.

Places 6–7, 8–9, 10–11, 12–13, 14–15, 16–17, 18–19, 20–21, 22–23, 24–25, 26–27, 28–29: Each group of two characters starting from place 6 indicates the capacity of a zone expressed as a number of cells belonging to the zone. On the basis of this zone capacity there is carried out a count of character pulses TG for determining where to write the beginning-of-zone tag bits B1. Each pair of characters therefore defines the place of the beginning-of-zone bit B1 of the zone following that with a capacity equal to the number expressed by the pair of characters. In the case where it is desired to create an alphabetical zone defined by two leading cells each with its own beginning-of-zone bit B1, the pair of characters which indicate the length of this alphabetical zone is preceded by a pair of characters with a code which produces the writing of a tag bit B1 in the cell following the last cell already marked with a beginning-of-zone bit B1 and which therefore comes to be the second leading cell of the alphabetical zone.

Places 30-31-32: Address characters of the following macroinstruction block.

ADDRESS OF A ZONE OF THE MEMORY LDR OR OF A BLOCK OF THE TAPE MEMORY N

The addresses of a zone of the memory LDR and of a block of the tape memory N are expressed by a number composed of two characters of four bits located respectively in places 8–9, 11–12, 14–15, 19–20, 28–29, 31–32 of the normal macroinstruction. The two characters of the address of a block on the tape are preceded by another character located in places 18, 27, 30 of the macroinstruction and which supplies the address of the track in which the block is included.

The address of the zone and of the block is a decimal number constituted (FIG. 3) by a digit of weight $10^1$ comprising the 16 binary configurations of the internal code of the computer and a digit of weight $10^0$ comprising the 10 configurations of the decimal binary code.

This address therefore represents one of 159 numbers corresponding to 159 zones of the memory LDR numbered in increasing order starting from the first zone ZE01, or corresponding to 159 blocks located within the limits of each track of the magnetic tape.

The character which precedes the two characters of the address of the block supplies an indication of the function associated with that block, in addition to the address of the track.

The character located in place 18 of the macroinstruction can indicate in the internal code of the computer the reading of a block to be transferred to the zone ZEO3 of the memory LDR by selecting the track P7, which is reserved for the macroinstruction and "printing subprogramme" blocks; the reading or writing of a block by selecting one of the remaining six tracks P1 - P6 of the tape memory N.

The characters located in places 27 and 30 of the macroinstruction control the reading of a block to be transferred to the programme zone ZE01 by selecting one track from the seven tracks of the tape.

The addressing of the zone and of the block may be expressed in indirect manner by putting in the places of the macroinstruction intended to receive the zone or block address a special indirect address code NN which, during the phases of interpretation of the instruction, causes the replacement of the code NN by the contents of the two least significant cells of the indirect address zone ZEO6.

The address of the track may also be expressed in indirect manner by the use of the code N for the tape-store reading instructions located in places 27 and 30 of the macroinstruction.

The writing of a address in the zone ZEO6 of the memory LDR can be carried out by an entry instruction from the symbol or numerical keyboard or by transfer from another zone of the store LDR.

Moreover, the code L can be placed in the places 27 and 30 of the macroinstruction, this code permitting, at the time of execution of the corresponding tape-store reading instruction and under the control of the control unit GN, the replacement of the code L in the register SPO of this control unit (FIG. 4) by the character generated by the striking of a programme key of the keyboard T.

ADDRESSING OF THE STORE LDR AND EXECUTION OF A PLURALITY OF SIMULTANEOUS INSTRUCTIONS

The contents of the memory LDR, which are formed by bits of information in series, have a non-recorded interval or "gap," between the last bit and the first bit of the items of information.

During each memory cycle the end-of-memory character FM is used to indicate the beginning of the "gap." A bistable device GP (FIG. 2a) is reset by a command C generated by the logic network RC upon the reading of this character and is set by the reading of the first bit leaving the amplifier AL after the bistable GP has been reset. The setting of bistable device GP synchronises the pulses T1 - T6 with the successive bits of information read, the pulses T1 - T6 being supplied by the timing device T which receives the outputs of the oscillator 0.

At each cycle of the memory LDR, the fixed-zone counter ZE, formed by six bistable devices connected in shift-register fashion, counts, under the control of the logic network CG, the first six pulses TG corresponding to the reading of the beginning-of-zone bits B1 of the first six zones of the memory LDR and supplies six separate indications ZEO1–ZEO6 corresponding to these zones.

During each memory cycle, the data zone indicating register ZO is operative to store the bits B3–B5 of the leading cell of a data zone and, therefore, to indicate the presence in the register LE of characters of a zone headed by an operation code, ZO is controlled by the logic network CG which in turn receives the outputs of the register ZO and interprets the bits of information B3–B5 read in the register LE in correspondence with the beginning-of-zone bits B1.

The register ZO is formed by three bistable devices ZOO1, ZOO2, ZOO3 (not shown separately) and indicates by the setting of the bistable device ZOO1 a zone with an internal operations code, by the setting of the bistable device ZOO2 a zone with a printing operation code, by the simultaneous setting of the bistable devices ZOO1, ZOO2 a zone with a keyboard operation code and by the setting of the bistable device ZOO3 a zone with an external operations code.

The writing of the beginning-of-zone codes in the memory LDR is effected by internal instructions provided with an address and respectively located in places 7–8–9, 10–11–12, 13–14–15 of the normal macroinstruction.

The interpretation and execution of each instruction of the normal macroinstruction begin in the initial state POO defined by the IP.

In the state POO, the instruction indicator II is enabled to count the 32 places of the macroinstruction in correspondence with the passage through the register LE of each of the 32 cells of the zone ZEO1.

The instructions of the macroinstruction are read and interpreted under the control of the internal operations control GOI which, during the execution of each instruction, positions the tag bit B2 in the cell of the zone ZE01 which contains the function character of the following instruction.

With the reading of the tag bit B2 in the zone ZEO1, the instruction indicator II and the label register E generate by means of the logic network DF a first signal which tells whether the execution of such instruction is to be controlled by the internal operations control GOI or by another control.

In the case of internal instructions, during the state POO the control GOI generates by means of the logic network RC and on the basis of the state of the label register E and of the instruction indicator II, examined in correspondence with the reading of the tag bit B2, commands C1 . . . Cn which stop the count in the indicator II, transfer the character with the tag bit B2 to the internal instructions register RFI, shift the tag bit B2 in the following two address cells of the instruction to permit transfer of the contents of these cells to the registers RAO–RA1, and position the tag bit B2 in the cell of the zone REO1 which contains the first character of the instruction following that being examined at the moment.

With the transfer of the function character of the instruction to the register RFI, there is energized a fresh output of the logic network DF which defines fully the function corresponding to the current instruction. If, for example, the instruction is of the internal-transfer-and-prearrangement-for-printing type ( ◇ USP), the internal operations control GOI remains engaged for the execution of this instruction. More particularly, under the control of the logic network CG, there is defined the new state PO1 of the computer, in which the logic network RC generates fresh commands which cause the registers RAO and RAI to be connected as a counter and insert an initial count therein. A count of 1 is performed in correspondence with each beginning of zone bit B1. The overflow of the counter RAO-RAI coincides with the presence in the register LE of the beginning-of-zone cell corresponding to the address of the instruction.

The overflow of the counter RAO-RAI, which is signalled by an internal condition bistable device CI, generates through the logic network RC fresh commands C1 – Cn for writing in the memory LDR, by means of the register SA, the internal operation beginning-of-zone code and for writing in that zone and in the arithmetical zone ZEO4 the tag bit B2 in the cells concerned in the transfer of the first character.

Transfers from the zone with an internal operations code to the arithmetical zone ZEO4 provide for the reversal of the order of sequence of the digits of the number contained therein, so that the zone with the operation code and the arithmetical zone can respectively contain a number already in readiness for the execution of the respective operations of printing and computation.

The arithmetical zone ZEO4 comprises two registers A and B interlaced in such manner that the successive cells of the zone contain characters belonging alternately to one and the other of the two registers A and B.

The transfer of the contents of a zone with an internal operations code to the register A or B of the arithmetical zone ZEO4 is commanded by the function code of the same ◇ USP transfer instruction.

This transfer is executed in the state PO3 of the computer, which replaces the state PO1, whereby there is terminated the operation of heading with the internal operations code of the zone addressed by the instruction.

In the state PO3, the logic network RC generates commands C1 –Cn to effect the internal transfer in conformity witth the principles set forth above by carrying out at each cycle of the memory LDR the transfer of a character from the internal operations zone to the register RAO and from this register to the register A or B of the arithmetical zone ZEO4, the two zones being respectively identified by the zone indicating register ZO and by the zone counter ZE and the individual cells of the respective zones by the respective tag bits B2. Under the control of the internal operations control GOI, the tag bits B2 shift at each cycle of the memory LDR through the successive cells of the two zones, starting, in the zone headed by the internal operations code, from the last cell of the zone which contains the least significant digit and, in the arithmetical zone ZEO4, from the first cell of the zone which receives the least significant digit of the number to be transferred. In the arithmetical zone ZEO4 the tag bit B2 is shifted two places in each cycle.

The end of the transfer, defined by the reading of the beginning-of-zone bit B1 of the zone headed by the internal operations code, causes the change of the computer from the state PO3 to the state PO4, during which the internal operations control GOI commands the erasure of the internal operations code and the writing of the printing operation code in the leading cell of the zone addressed.

Thus the zone defined by the address of the internal instruction is left headed by the printing operation code and is therefore ready to be used by a printing instruction of the same macroinstruction or of following macroinstructions.

With the end of each instruction which engages the internal operations control GOI in the execution phase, the instruction indicator II is reset to zero, so as then to resume, with the first reading of the zone ZEO1, the count of the successive 32 cells of this zone and stop at the cell marked with the tag bit B2, which contains the first character of the following instruction of that macroinstruction.

In similar manner, the internal instructions located in places 7–8–9, 10–11–12, 13–14–15 of the normal macroinstruction may define zones with a keyboard operation or external operations code. These zones may be used by instructions for entry from the keyboard or for transfer from or to the tape memory, of that macroinstruction or of a following macroinstruction.

From the description of the instruction of internal transfer with prearrangement for printing of the zone addressed by the instruction, it is apparent that the operation code of a data zone of the memory LDR may be used to address that zone during successive cycles of the store, replacing a beginning-of-zone bit B1 counter, and that moreover the code designates the respective zone for a predetermined internal-transfer or external-transfer operation.

The internal instruction which heads a data zone of the memory LDR with an operation code may command the control GOI to carry out immediately the transfer relating to that zone or simply designate the zone for operations which are performed subsequently under the control of the internal operations control GOI or of other controls of the computer.

The tabulation and paper services instructions, which are located in cells 2, 3 and 4, 5, 6, respectively, of the memory LDR, engage the memory LDR and the internal operations control GOI only for the time of reading of the characters of the instruction. These characters are transferred to the printing-tabulation control GOS and the paper services control GOT, respectively, which provide for the performance of the relevant commands and for creating internal conditions which signal the engagement of the peripheral units on the channel X to the internal operations control GOI.

The internal instructions (arithmetical instructions, transfer instructions, instructions for heading of a zone with printing, keyboard or external operations codes) located in the cells 7–8–9, 10–11–12, 13–14–15 of the zone ZEO1 are executed in a number of cycles which depends on the length of the operand addressed. The reading of the programme zone is stopped for the whole of the time required for the execution of the instruction.

The instructions for transfer to and from the tape memory which are located in cells 18–19–20, 27–28–29, and 30–31–32 of the zone ZEO1 of the memory LDR are executed in a number of memory cycles depending on the length of the transfer.

During the execution of these instructions, the reading of the programme zone is stopped because the instructions simultaneously engage the internal operations control GOI and the tape memory control GN, which respectively provide for the transfer of groups of characters of the memory LDR to the buffer formed by the registers RAO, RAI, REO, REI and for the transfer of the characters from the buffer to the magnetic tape N.

In the case of recording in the magnetic tape memory 1, the zone of the memory LDR which is concerned in the transfer is always a long-section zone, while in the case of reading of the magnetic tape memory the zones of the store LDR which are concerned in the transfer may be a long-section zone, the programme zone ZEO1 or the printing subprogramme zone ZEO3.

The printing-from-memory instruction located in cells 21 and 22 of the zone ZEO1 engages the printing control GOS and the zone of the store LDR with the printing code in the leading cell.

The printing-from-keyboard instruction located in cells 21 and 23 of the zone ZEO1 engages the printing control GOS and the keyboard selected.

The instructions for entry from the numerical and alphabetical or symbol keyboard which are located in cells 23 and 24 of the zone ZEO1 engage the keyboard control GOT and the zone ZEO5 and the zone with the keyboard operation code in the leading cell, respectively, of the memory LDR.

In the instructions which concern the printing control GOS, the keyboard control GOT and the paper services control GSC characters of the instructions are transferred to the respective controls. These controls execute the instruction and signal the engagement of the correspnding peripheral unit to the internal operations control on the respective channels. The reading of the programme zone ZEO1 is not stopped during the execution of these instructions.

The stopping of the reading of the instructions of the programme zone ZEO1 is effected under the control of the internal operations control GOI during the execution of internal instructions and instructions for transfer to and from the tape memory. It is also stopped in consequence to printing, keyboard or paper services instructions, etc., if the printing-tabulation control GOS, the keyboard control GOT or the paper services control GSC is already engaged in the execution of a preceding instruction incompatible with the current instruction.

The existence of controls separate from the internal operations control GOI for controlling transfers on a corresponding peripheral channel, and of operation codes for designating data zone for an external transfer, limits the engagement of the internal operations control GOI, in transfers on peripheral channels, to the reading of the instruction. The transfer is then executed under the control of the respective peripheral controls.

Therefore, it is possible, during each memory cycle to overlap the reading and execution of an internal instruction or an instruction for transfer from and to the tape with the execution of printing, entry-from-keyboard or paper services instructions or instructions relating to another external channel, provided that the instructions do not engage the same mechanical means.

EXCHANGE OF INFORMATION BETWEEN THE STORE LDR AND THE MAGNETIC TAPE STORE

Transfers of a long section of the memory LDR to the magnetic tape memory N and the transfer of a block of the magnetic tape store to the long section of the memory LDR are programmed by instructions located in places 10–11–12, 13–14–15, 18–19–20 of the normal macroinstruction.

Transfers from the tape N of the macroinstruction and printing subprogramme blocks to the fixed zones ZEO1 and ZEO3 respectively of the memory LDR are programmed by instructions located in places 27–28–29 or 30–31–32 and 18–19–20, respectively, of the normal macroinstruction.

A long section of the memory LDR is delineated by recording external operation codes in the beginning of zone cells CO at either end in response to the instructions contained in cells 10–11–12 and 13–14–15 of the normal macroinstruction. The contents of the long section are thereafter transferred to the magnetic tape or the long section receives a tape block in consequence of the instruction located in cells 18–19–20.

The long section may contain a plurality of zones defined by beginning-of-zone bits B1, provided that they have their leading cells free from external operations, printing or keyboard operation codes.

With the reading of cell 18 of the programme zone ZEO1 there is indicated the track to be selected and the function to be performed (recording or reading), while the address of the block is given by the characters located in cells 19 and 20.

The recording of a block in the tape 1, which is commanded by the instruction located in cells 18–19–20, can be carried out only on tracks P1 – P6 of the tape and always requires the definition of a long section in the memory LDR.

The reading of a block of the tape 1, programmed in cells 18–19–20, can transfer the block addressed from the tracks P1 – P6 of the tape to the long section or transfer a block of a fixed length of 32 characters and which has the function of a printing subprogramme from the track P7 of the tape to the fixed zone ZEO3 of the store LDR.

The reading of a block of the tape store, programmed in cells 27–28–29 or 30–31–32, effects the transfer of the macroinstruction from a track P1 – P7 of the tape to the programme zone ZEO1.

In the transfer of the macroinstruction and the printing subprogramme block to the memory LDR, the reading process is substantially like the process of reading a block intended for the long section and differs only in the addressing of the memory LDR.

RECORDING ON TAPE

The instruction for recording the long section held in the memory LDR begins its execution phase after the reading of cells 18–19–20 of the programme zone ZEO1, during which the character located in cell 18 is transferred to the internal instructions register RFI and the characters located in cells 19–20 are transferred to the registers RAO and RAI, respectively.

The instruction indicating register II is stationary at place 18, corresponding, in the normal macroinstruction, to the function of the tape instruction.

If the registers RAO, RAI contain the indirect address code NN, instead of a block address, the address contained in the second and third cells of the address zone ZEO3 is transferred to the registers.

The registers RAO and RAI, formed by the four bistable devices RAO1, RAO2, RAO4, RAO8, and RA11, RA12, RA14, RA18, respectively, form part of a buffer RA (FIG. 4) which can be extended from two to six registers in relation to the length of the delay line of the memory LDR. The number of registers is determined by the ratio between the time required for one cycle of the memory LDR and the frequency of reading from or recording on tape.

Figure 4:
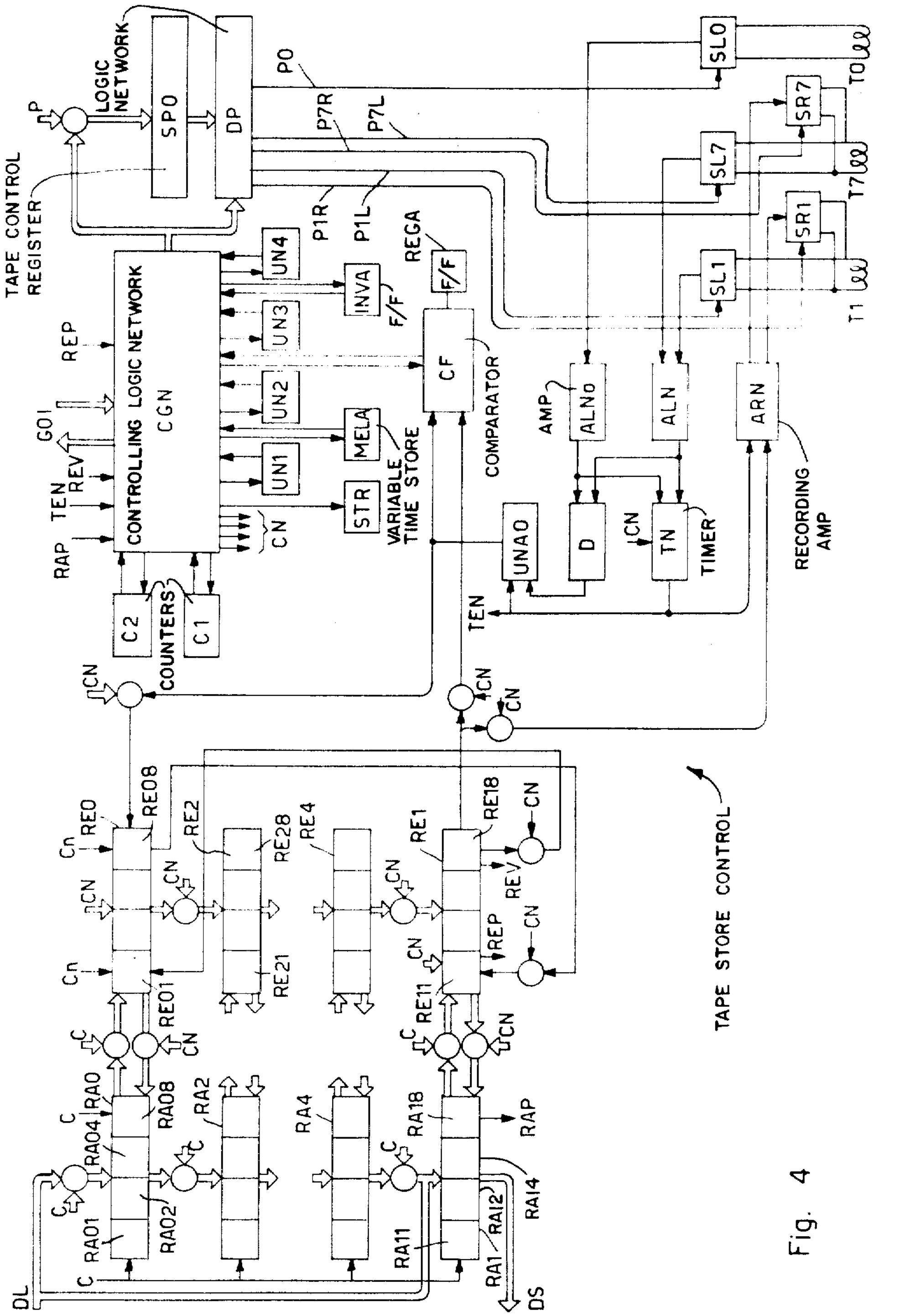
FIG. 4 is a block diagram of a number of elements associated with the control of the tape memory.

Irrespective of the number of registers of which the buffer RA is composed, the registers RAO, RAI are always the first and last registers of the buffer and between the registers are located the registers, RA2, RA4, as is indicated in FIG. 4.

In the tape operations there is moreover used a second buffer RE formed by the same number of registers, each having four bistable devices as make up the buffer RA and of which the registers REO and REI are the first and last registers respectively.

The transfer of the characters from and to tape is preceded by a search for the address of the block.

In the state PO1, defined by the internal operations control GOI during the instruction of recording on tape, the contents of the buffer RA are transferred to the buffer RE, the buffer RA is zeroised and a tag bit Ba is written in the bistable device RAO8 of the buffer RA (FIG. 4).

In the state PO3, which follows the state PO1, there begins the transfer of the characters of the long section to the buffer RA until the buffer RA is completely filled. This transfer is carried out character by character from the output register LE to the register RAO of the buffer RA, and at the same time the contents of each register shifts at each character pulse TC to the lower register until the register RA1 is filled.

The tag bit Ba entered in the bistable RAO8 signals that the buffer RA is full when it is extracted from the bistable device RA18 of the register RA1.

The filling of the buffer RA interrupts the reading of the long section, while the advance of the tag bit B2 inside the long section is arrested at that store cell from which the following transfer from the long section to the buffer RA begins.

The state PO3 is followed by the state PO4, in which the controlling logic network CGN of the control GN selects the reading amplifier ALN of the track PO. This section is carried out by rendering operative the output PO of a logic network DP fed by the outputs of a register SPO which stores the track address character, and which is initially zeroised.

The same logic network CGN sets a start bistable device STR, which starts the tape motor, and a univibrator UNI, which covers the starting time.

The tape is recorded by the frequency duplication system which supplies for each track the clock signals and the corresponding indications "one" and "zero" of the corresponding binary information.

The timing device TN (FIG. 4), which generates the pulses TEN concurrently with each tape clock signal, supplies in co-operation with a discriminating unit D fed by the amplifier ALNo, the binary bit recorded on the tape with each clock signal. This binary information is stored in the bistable device UNAO at each pulse TEN.

The reading necessary for searching for the address of the block must be made possible in the gap preceding the eight bits of the address of the block. To this end, a variable-time store MELA is rendered operative initially together with the univibrator UN1 and thereafter at each pulse TEN for a time of prefixed duration. The deactivation of the store MELA therefore signals the presence of a gap below the reading head.

The deactivation of the store MELA commands the change from the state PO4 to the state PO5 in the internal operations control GOI through the medium of the logic network CGN of the control GN.

In the state PO5, the pulses TEN which are generated at each clock signal after the gap permit, by means of the logic network CGN, a comparison between the bistable device UNAO and the bistable device RE18 of the buffer RE, which is carried out in the comparator CF. The pulses TEN also cause by means of commands CN generated by the logic network CGN, the contents of the registers REO, RE1, which are closed in a ring, to shift so as to permit the comparison to be effected at all eight bits of the address. The result of the comparison bit by bit is stored in the bistable device REGA.

At the same time, a counter CI counts the pulses TEN and, with the eighth count, sets a univibrator UN2 which, on resetting, investigates the state of the counter C1 and signals through the medium of the bistable INVA the absence of pulses TEN following that which causes the counter C1 to assume the configuration eight.

If the signal INVA is present, this makes possible the examination of the result of the comparison stored in the bistable device REGA, which, if the comparison yields equality, signals the end of the search for the address.

This signal, sent by the unit CGN of the control GN to the control GOI, causes the change to the new state PO6, during which the contents of the register RFI of the control GOI are transferred through the channel P to the register SPO of the tape control GN and the univibrator UN3 is set. The contents of the register SPO cause the selection for recording of the corresponding track of the tape by means of the logic network DF, which energises the output corresponding to the selection unit SR connecting the head of that track to the recording amplifier ARN. The selection for recording gives rise to the erasure of the magnetic tape, which continues until the univibrator UN3 is rendered inoperative.

On the univibrator UN3 being rendered inoperative, the contents of the buffer RA are transferred to the buffer RE and a command CN renders operative the timing device TN, which generates the pulses TEN which time the writing. This is carried out by successive transfers of groups of characters from the buffer RE to the tape, from the buffer RA to the buffer RE and from the memory LDR to the buffer RA.

The filling of the buffer RA from the memory LDR and the transfer from the buffer RA to the buffer RE are carried out as described in the case of the state PO3.

The bits recorded on tape are extracted in correspondence with the information pulses TEN from the bistable device RE18 of the buffer RE. Each information signal TEN moreover commands the counter C2, which counts the bits of each character which are transmitted to the tape and causes the shifting of the contents of the bistable devices of the register RE1 to the right so as to present the successive bits of the character contained in the register RE1 in the bistable RE18.

After the fourth count, the counter C2 overflows and the logic network CGN commands the vertical shifting of the registers of RE towards the lower register RE1 and the writing of a tag bit Be in the bistable REO8 of the register REO. The successive transfer of characters from the register RE1 to the tape is accompanied, at each overflow of the counter C2, by a vertical shifting carried out in the registers of the buffer RE until the tab bit Be recorded in the bistable REO8 reaches the bistable RE18 of the last register and signals the emptying of the buffer RE to the logic network CGN. This signal produces a fresh transfer from the buffer RA to the buffer RE.

The transfers from the memory LDR to the buffer RA terminate with the reading of the external operation code located in the cell delimiting the long section.

The last filling of the buffer RA will generally not be such as to fill it completely and the indication that the buffer RA is full will be replaced by that indicating the end of the long section. In this case, the last transfer from RA to RE will be followed by a series of vertical shifts in the registers of the buffer RE carried out by pulses TG, until the tag bit Ba recorded initially in the bistable RAO8 of the register RAO and then transferred to the buffer RE issues from the bistable RE18 of the register RE1.

The first of these vertical shifts is moreover accompanied by the writing of a tag bit Be in the bistable REO8 of the register REO, which is therefore in a position to signal, in the following phase of transfer from the buffer RE to the tape, the reading of the last bit of the last character of the block by the passage of said tag bit Be to the bistable device RE18.

READING OF TAPE

In the reading of a tape block, the transfer of the characters of the block to the memory LDR is preceded by an address search similar to that discussed in connection with recording tape.

The initial state PO1, during which the register RFI and the registers RAO of the buffer RA are filled and the transfer of the contents of the buffer RA to the buffer RE is carried out, is not followed by the state PO3 in which characters are transferred from the long-section zone to the buffer RA, but directly by the states PO4, PO5 for searching for the address of the block.

In the subsequent state PO6, the transfer of the contents of the register RFI to the register SPO of the tape control is effected, the corresponding track is selected for reading and the univibrator UN4, which covers selection disturbances, is rendered operative. This selection is carried out through the medium of the logic network DP, which energizes the output corresponding to the selection unit SL of that track, which selection unit connects the head to the reading amplifier ALN.

On the univibrator UN4 being rendered inoperative, the reading of the block begins.

The individual bits are transferred at each pulse TEN to the bistable device REO8 of the register REO, while at the same time the shifting of the contents of each bistable device of REO to the left and a count of 1 in the counter C2 are effected.

Every four counts of C2, each register of RE shifts vertically towards the lower register. The complete filling of RE is signalled by a tag bit Be which, recorded initially in REO1, is transferred to RE11 in correspondence with the vertical shift commanded by the counter C2.

The filling of the buffer RE produces in the control GOI the new state PO7 of the computer, during which the contents of the buffer RE are transferred to the buffer RA.

The contents of RA are transferred in turn to the long-section zone of the memory LDR, while the buffer RE is again ready to receive the fresh characters read on the tape.

The writing of each character in the memory LDR takes place by transferring, at each pulse TG, the character contained in the register RA1 to the register SA for writing in the memory, after the zone of the memory LDR and the cell from which the transfer is to commence have been identified by the zone indicating means and the tag bit B2, respectively.

Each passage of a character from the register RA1 to the register SA is accompanied by a vertical shift of each register of RA towards the lower register.

A tag bit Ba recorded in the bistable device RAO8 of the register RAO simultaneously with the first vertical shift performed in the buffer RA indicates the emptying of the buffer RA when this tag bit Ba is extracted from the bistable RA18 of the register RA1.

If the last group of characters read on the tape does not fill the buffer RE, filling is completed by simulating the pulses TEN and writing a tag bit Be in REO8 simultaneously with the first pulse TEN that is simulated.

In this way, in the following transfer from the buffer RE to the buffer RA, the buffer RA comes to contain the tag bit Ba already positioned in such manner as to effect the transfer only of the significant characters from the register RA1 to the register SA.

EXTENDED PROGRAM ZONE

As discussed above, the performance of many operations, such as the calculation of trigonometric functions, requires the execution of a plurality of macroinstructions. The necessity, in the aforementioned prior art computer, of repeated access to the tape memory 1 for each macroinstruction substantially slowed its operation.

This difficulty is solved in the compuer of the present invention by the provision of means for serially executing a plurality of macroinstructions which are stored in a long section of the memory LDR. These macroinstructions may be transferred from the tape memory 1 to the long section in a single transfer operation in the same manner as was previously described for transferring data. A single macroinstruction is stored in each zone of the long section so that the beginning of zone signals separate the macroinstructions.

In carrying out a calculation requiring several macroinstructions, the portions of the macroinstruction which control paper feeding, tabulation, etc., are often not used. In order to speed up the operation of the machine even more, provision is made for allowing the execution of truncated macroinstructions in which unnecessary portions are omitted.

In order to initiate the execution of the macroinstructions stored in the long section, a special jump instruction, designated "J," (FIG.3) must be stored in one of several locations of the macroinstruction being executed in zone ZEO1 of the memory LDR. This jump instruction may be located in places 7,10,13,18,27, or 30 of the normal macroinstruction.

The interpretation of the jump instruction by the internal functions register RFI (FIG. 2*a*) causes the internal operations control GOI to reset the instruction indicator II to zero and to set a bistable device in the internal-condition bistable devices CI. The setting of this bistable device causes the instruction indicator II to begin counting when the register ZO indicates the external operations code which heads the long section rather than when the first bit of the memory cycle issues from the delay line LDR.

The internal operations control GOI also erases the B2 bit from the ZEO1 zone and records it in the cell following the cell containing the external operations code.

The execution of the macroinstructions contained in the long section now proceeds in a manner similar to the execution of one in the zone ZEO1. The bit B2 is moved along in the same manner so that it is located at the function character of the next instruction to be executed.

Whenever the internal operations control GOI senses the reading of a beginning of zone character, CO (i.e., a character having a B1 bit) the instruction indicator II is reset to zero and the execution of the new macroinstruction in the next zone of the long section begins. In this way a macroinstruction in the long section may be cut off at any convenient point when the execution of the instructions contained in the following portion is not necessary. This allows the execution of the program to be speeded.

If the beginning of zone character CO also contains a bit B6, the internal operations control GOI resets the instruction indicator to 6 rather than to zero. In this way the execution of the following macroinstruction begins at the seventh place and the portion of the macroinstruction dealing with the tabulation and paper movement control is skipped. In this case the label character of the previous macroinstruction remains stored in the label register E and controls the interpretation of the instructions of the present macroinstruction. The bit B6 may also be recorded with the external operations code which heads the long section, in which case the execution of the first macroinstruction begins at the seventh character with the same label as the macroinstruction in the zone ZEO1.

A macroinstruction in the long section may contain a block address for the magnetic tape memory in either or both of places 27–28–29 or 30–31–32.

These instructions are interpreted by the computer in the same manner as in macroinstructions contained in the zone ZEO1 and cause the transfer of a new macroinstruction to the zone ZEO1. A transfer specified in cells 27–28–29 is executed only if a jump condition specified in cells 25 or 26 has occurred and a transfer specified in cells 30–31–32 is executed if the specified jump conditions have not occurred.

The execution of one of these transfer instructions also resets the bistable device in the internal condition bistable devices CI so that the instruction indicator II once again begins to count from the first cell of the zone ZEO1. Thus the execution of the macroinstruction in the long section ceases and the normal execution of the macroinstructions in the program zone ZEO1 resumes.

If cells 27 or 30 of a macroinstruction under execution, either in the zone ZEO1 or in the long section contain a code L instead of a track address it's interpretation by the internal function register RFI causes the internal operations control GOI to jump back to the beginning of the macroinstruction or long section, respectively and to being execution again there.

A more complete description of the operation of some of the peripheral units which may be associated with the computer of this invention may be found in the aforementioned patent application, Ser. No. 783,894, now U.S. Pat. No. 3,585,600, issued June 15, 1971.

What is claimed is:

1. A method for executing a program made up of a series of macro-instructions, each of said macro-instructions including a plurality of instructions grouped in a fixed order, information and said macroinstructions being stored in zoned portions of a serial operational memory, comprising:

interpreting and executing instructions of a macroinstruction stored in a predetermined portion of the operational memory, and interpreting the information stored in a selected portion of the memory as a series of macroinstructions comprising at least a portion of said program in response to a predetermined instruction of the macroinstruction being interpreted and executed.

2. The method of claim 1 comprising transferring a new macro-instruction of said series of macroinstructions to the predetermined portion of the operational memory in response to the interpretation of a predetermined instruction in the information macroinstruction stored in said selected portion of said operational memory.

* * * * *